(12) United States Patent
Dieterle et al.

(10) Patent No.: US 7,731,916 B2
(45) Date of Patent: Jun. 8, 2010

(54) METHOD OF CHARGING CATALYST TUBES OF A BUNDLE OF CATALYST TUBES IN A STRUCTURED FASHION

(75) Inventors: Martin Dieterle, Mannheim (DE); Knut Eger, Limburgerhof (DE); Klaus Joachim Mueller-Engel, Stutensee (DE); Ulrich Hammon, Mannheim (DE); Volker Schliephake, Schifferstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 907 days.

(21) Appl. No.: 11/118,433

(22) Filed: May 2, 2005

(65) Prior Publication Data

US 2006/0045825 A1     Mar. 2, 2006

Related U.S. Application Data

(60) Provisional application No. 60/568,699, filed on May 7, 2004.

(30) Foreign Application Priority Data

May 7, 2004     (DE) ................ 10 2004 023 249

(51) Int. Cl.
    *B65B 1/04*          (2006.01)
(52) U.S. Cl. ................ 422/196; 422/197; 414/808
(58) Field of Classification Search ................ 422/232, 422/312, 219, 196, 197; 141/9, 102, 198, 141/297; 261/94–98; 95/211; 96/290, 291, 96/299; 414/808

See application file for complete search history.

(56) References Cited

U.S. PATENT DOCUMENTS

| | | | |
|---|---|---|---|
| 2,310,907 A | 2/1943 | McMillan | |
| 3,119,837 A | 1/1964 | Kingsley et al. | |
| 3,147,084 A | 9/1964 | Franzen et al. | |
| 3,702,259 A | 11/1972 | Nielsen | |
| 3,799,886 A | 3/1974 | Felice et al. | |
| 3,865,555 A | 2/1975 | Elebracht et al. | |
| 3,871,445 A | 3/1975 | Wanka et al. | |
| 3,901,659 A | 8/1975 | Joklik et al. | |
| 3,956,377 A | 5/1976 | Dolhyj et al. | |
| 4,077,912 A | 3/1978 | Dolhyj et al. | |
| 4,203,903 A | 5/1980 | Evans | |
| 4,203,906 A | 5/1980 | Takada et al. | |
| 4,256,783 A | 3/1981 | Takada et al. | |
| 4,310,118 A * | 1/1982 | Kisida et al. ................ 383/102 |
| 4,402,643 A | 9/1983 | Lytton et al. | |
| 4,408,079 A | 10/1983 | Merger et al. | |
| 4,496,770 A | 1/1985 | Duembgen et al. | |
| 5,144,091 A | 9/1992 | Martan et al. | |
| 5,173,468 A | 12/1992 | Boehning et al. | |
| 5,198,581 A * | 3/1993 | Kawajiri et al. ............. 562/546 |
| 5,221,767 A | 6/1993 | Boehning et al. | |
| 5,231,226 A | 7/1993 | Hammon et al. | |
| 5,264,625 A | 11/1993 | Hammon et al. | |
| 5,266,546 A | 11/1993 | Hearn | |
| 5,550,298 A | 8/1996 | Shelden et al. | |
| 5,668,077 A | 9/1997 | Klopries et al. | |
| 5,677,261 A | 10/1997 | Tenten et al. | |
| 5,734,068 A | 3/1998 | Klopries et al. | |
| 5,739,393 A | 4/1998 | Wagner et al. | |
| 5,821,390 A | 10/1998 | Ruppel et al. | |
| 6,333,011 B1 | 12/2001 | Schliephake et al. | |
| 6,657,088 B2 | 12/2003 | Schliephake et al. | |
| 6,781,017 B2 | 8/2004 | Machhammer et al. | |
| 6,867,328 B2 | 3/2005 | Borgmeier et al. | |
| 7,226,567 B1 * | 6/2007 | Olbert et al. ................ 422/197 |
| 7,534,339 B2 | 5/2009 | Matsumoto et al. | |
| 2001/0041117 A1 * | 11/2001 | Comardo .................... 414/160 |
| 2003/0006026 A1 | 1/2003 | Matsumoto et al. | |
| 2003/0187299 A1 | 10/2003 | Machhammer et al. | |
| 2004/0171887 A1 | 9/2004 | Berndt et al. | |
| 2004/0181083 A1 | 9/2004 | Proll et al. | |
| 2004/0199000 A1 | 10/2004 | Borgmeier et al. | |
| 2004/0242925 A1 | 12/2004 | Berndt et al. | |
| 2004/0249203 A1 | 12/2004 | Yada et al. | |
| 2004/0250868 A1 | 12/2004 | Yada et al. | |
| 2007/0003460 A1 | 1/2007 | Matsumoto et al. | |

FOREIGN PATENT DOCUMENTS

| | | |
|---|---|---|
| DE | 1 254 137 | 11/1967 |
| DE | 2 025 430 | 12/1971 |
| DE | 2 159 346 | 6/1972 |
| DE | 2 106 796 | 8/1972 |

(Continued)

OTHER PUBLICATIONS

English translation of ZHAO, Xiao-long, "Operation of Transforming Catalysts in Hydrogen Plant and Carbon Deposition", (Refinery of Tianjin Petrochem. Co., Tianjin Dagang 300271, China), Article ID: 1008-1143 (2000) 03-0052-05.

*Primary Examiner*—Jill Warden
*Assistant Examiner*—Cedric Chan
(74) *Attorney, Agent, or Firm*—Oblon, Spivak, McClelland, Maier & Neustadt, L.L.P.

(57) ABSTRACT

A method of charging catalyst tubes of a bundle of catalyst tubes in a structured fashion, in which uniformly predispensed portions of formulations of shaped catalyst bodies are used for producing a section of charge.

11 Claims, No Drawings

FOREIGN PATENT DOCUMENTS

| | | |
|---|---|---|
| DE | 2 201 528 | 11/1972 |
| DE | 2 310 517 | 9/1973 |
| DE | 2 231 557 | 1/1974 |
| DE | 2 351 151 | 4/1974 |
| DE | 25 26 238 | 1/1976 |
| DE | 25 13 405 | 10/1976 |
| DE | 28 30 765 C2 | 1/1980 |
| DE | 29 03 582 | 8/1980 |
| DE | 40 22 212 A1 | 1/1992 |
| DE | 41 32 263 A1 | 4/1993 |
| DE | 41 32 684 A1 | 4/1993 |
| DE | 43 11 608 A1 | 12/1994 |
| DE | 44 31 949 A1 | 3/1995 |
| DE | 44 42 346 | 5/1996 |
| DE | 199 34 324 A1 | 9/2000 |
| DE | 100 28 582 A1 | 12/2001 |
| DE | 100 46 672 A1 | 3/2002 |
| DE | 101 31 297 A1 | 1/2003 |
| EP | 0 058 927 A1 | 9/1982 |
| EP | 0 092 097 A1 | 10/1983 |
| EP | 0 372 972 A1 | 6/1990 |
| EP | 0 383 224 A2 | 8/1990 |
| EP | 0 456 837 A1 | 11/1991 |
| EP | 0 468 290 A1 | 1/1992 |
| EP | 0 522 871 A1 | 1/1993 |
| EP | 0 529 853 A2 | 3/1993 |
| EP | 0 608 838 A2 | 8/1994 |
| EP | 0 700 714 A1 | 3/1996 |
| EP | 0 873 783 A1 | 10/1998 |
| EP | 0 900 774 A1 | 3/1999 |
| EP | 0 979 813 A1 | 2/2000 |
| EP | 1 090 684 A1 | 4/2001 |
| EP | 1 106 598 A2 | 6/2001 |
| EP | 1 270 065 | 1/2003 |
| EP | 1 440 730 A1 | 7/2004 |
| GB | 1 291 354 | 10/1972 |
| GB | 1 346 943 | 2/1974 |
| GB | 1 427 252 | 3/1976 |
| GB | 1 464 198 | 2/1977 |
| JP | 08-252464 | 10/1996 |
| JP | 2003-001094 | 1/2003 |
| WO | WO 98/14392 | 4/1998 |
| WO | WO 01/94006 A2 | 12/2001 |
| WO | WO 01/96270 A2 | 12/2001 |
| WO | WO 03/057653 A1 | 7/2003 |
| WO | WO 03/059857 A1 | 7/2003 |

* cited by examiner

METHOD OF CHARGING CATALYST TUBES OF A BUNDLE OF CATALYST TUBES IN A STRUCTURED FASHION

The present invention relates to a method of charging catalyst tubes of a bundle of catalyst tubes in a structured fashion, in which individual catalyst tubes of the bundle of catalyst tubes are charged in a uniform manner from the bottom upward in sections with different formulations of shaped catalyst bodies.

Processes for carrying out heterogeneously catalyzed gasphase reactions over a fixed bed of catalyst located in the usually vertical tubes of shell-and-tube reactors (reactors which have a bundle of catalyst tubes present in a reactor shell) are known, just like the shell-and-tube reactors required for this purpose (cf., for example, DE-A 44 31 949, EP-A 700 714). These can be either endothermic or exothermic gasphase reactions. In both cases, the reaction gas mixture is passed through the fixed bed of catalyst located in the catalyst tubes of the shell-and-tube reactor and the reactants are reacted partially or completely during the residence time of the reactants over the catalyst surface. The reaction temperature in the catalyst tubes is controlled by passing a liquid heat transfer medium around the catalyst tubes of the tube bundle located in a shell in order to introduce energy into the reaction system or to remove energy from the reaction system. The heat transfer medium and reaction gas mixture can be passed through the shell-and-tube reactor either in cocurrent or in countercurrent.

Apart from the possibility of passing the heat transfer medium in a simple manner essentially directly in a direction longitudinal to the catalyst tubes, this longitudinal transport can also be realized only over the entire reactor shell and transverse flow can be superimposed on this longitudinal flow within the reactor shell by means of a succession of deflection plates which leave parts of the cross section free and are arranged along the catalyst tubes, so that a meandering flow of the heat transfer medium results in a longitudinal section through the bundle of tubes (cf., for example, DE-A 44 31 949, EP-A 700 714, DE-PS 28 30 765, DE-A 22 01 528, DE-A 22 31 557 and DE-A 23 10 517).

If necessary, heat transfer media which are substantially separated from one another in space can be passed around the catalyst tubes at tube sections located at different positions along the tubes. The tube section over which the particular heat transfer medium extends then usually represents a separate reaction zone. A preferred variant of such multizone shell-and-tube reactors is the two-zone shell-and-tube reactor as described, for example, in the documents DE-C 28 30 765, DE-C 25 13 405, U.S. Pat. No. 3,147,084, DE-A 22 01 528, EP-A 383 224 and DE-A 29 03 582.

Suitable heat transfer media are, for example, melts of salts such as potassium nitrate, potassium nitrite, sodium nitrite and/or sodium nitrate, low-melting metals such as sodium, mercury and alloys of various metals, ionic liquids (in which at least one of the oppositely charged ions contains at least one carbon atom), but also conventional liquids such as water or high-boiling organic solvents (e.g. mixtures of Diphyl® and dimethyl phthalate).

The catalyst tubes are usually made of ferritic steel or stainless steel and frequently have a wall thickness of a few mm, e.g. from 1 to 3 mm. Their internal diameter is usually a few cm, e.g. from 10 to 50 mm, frequently from 20 to 30 mm. The tube length is normally in the range of a few meters (the catalyst tube length is typically in the range from 1 to 8 m, frequently from 2 to 6 m, often from 2 to 4 m). The number of catalyst tubes (working tubes) accommodated in the shell is, from an operational point of view, advantageously at least 1000, frequently at least 3000 or 5000 and often at least 10 000. The number of catalyst tubes accommodated in the reactor shell is frequently from 15 000 to 30 000 or 40 000 or 50 000. Shell-and-tube reactors having more than 50 000 catalyst tubes tend to be the exception. The catalyst tubes are normally distributed essentially homogeneously within the shell, with the distribution advantageously being such that the distance between the central internal axes of nearest-neighbor catalyst tubes (the catalyst tube spacing) is from 25 to 55 mm, frequently from 35 to 45 mm (cf., for example, EP-A 468 290).

Normally, at least some of the catalyst tubes (working tubes) of a shell-and-tube reactor are, from an operational point of view, advantageously uniform (within the limits of manufacturing accuracy) over their entire length, i.e. their internal diameter, their wall thickness and their length are identical within narrow tolerances (cf. WO 03/059857).

The abovementioned requirement profile frequently also applies to the charging of such uniformly manufactured catalyst tubes with shaped catalyst bodies (cf., for example, WO 03/057653) in order to ensure optimal and essentially troublefree operation of the shell-and-tube reactor. It is important, in particular in order to achieve an optimum yield and selectivity of the reactions carried out in the shell-and-tube reactor, that preferably all working tubes of the reactor are charged as uniformly as possible with the catalyst bed.

A distinction is usually made between working tubes and thermotubes as are described, for example, in EP-A 873 783. While the working tubes are those catalyst tubes in which the chemical reaction to be carried out is actually carried out, thermotubes serve first and foremost to monitor and control the reaction temperature in the catalyst tubes. For this purpose, the thermotubes normally contain, in addition to the fixed bed of catalyst, a centrally located thermocouple sheath which is provided only with a temperature sensor and runs longitudinally in the thermotube. As a rule, the number of thermotubes in a shell-and-tube reactor is very much smaller than the number of working tubes. The number of thermotubes is normally $\leq 20$.

What has been said above applies in particular to heterogeneously catalyzed gas-phase partial oxidations of at least one organic compound which are carried out in shell-and-tube reactors and during which a comparatively large quantity of heat is liberated.

Examples which may be mentioned are the conversion of propene into acrolein and/or acrylic acid (cf., for example, DE-A 23 51 151), the conversion of tert-butanol, isobutene, isobutane, isobutyraldehyde or the methyl ether of tert-butanol into a methacrolein and/or methacrylic acid (cf., for example, DE-A 25 26 238, EP-A 92 097, EP-A 58 927, DE-A 41 32 263, DE-A 41 32 684 and DE-A 40 22 212), the conversion of acrolein into acrylic acid, the conversion of methacrolein into methacrylic acid (cf., for example, DE-A 25 26 238), the conversion of o-xylene or naphthalene into phthalic anhydride (cf., for example, EP-A 522 871) and the conversion of butadiene into maleic anhydride (cf., for example, DE-A 21 06 796 and DE-A 16 24 921), the conversion of n-butane into maleic anhydride (cf., for example, GB-A 1 464 198 and GB-A 1 291 354), the conversion of indanes into, for example, anthraquinone (cf., for example, DE-A 20 25 430), the conversion of ethylene into ethylene oxide or of propylene into propylene oxide (cf., for example, DE-B 12 54 137, DE-A 21 59 346, EP-A 372 972, WO 89/0710, DE-A 43 11 608), the conversion of propylene and/or acrolein into acrylonitrile (cf., for example, DE-A 23 51 151), the conversion of isobutene and/or methacrolein into methacrylonitrile (i.e. the term partial oxidation also encompasses, for the purposes of the present text, partial ammoxidation, i.e. partial oxidation in the presence of ammonia), the oxidative dehydrogenation of hydrocarbons (cf., for example, DE-A 23 51 151), the conversion of propane into acrylonitrile or into acrolein and/or acrylic acid (cf., for example, DE-A 101 31 297, EP-A 1 09 0684, EP-A 608 838, DE-A 100 46 672, EP-A 529 853, WO 01/96270 and DE-A 100 28 582) etc.

The catalysts to be used for carrying out heterogeneously catalyzed gas-phase reactions over the fixed bed of catalyst located in the tubes of shell- and tube reactors are normally active compositions which can be shaped to produce shaped bodies of a variety of geometries (referred to as shaped catalyst bodies). Examples of such shaped bodies are spheres, pellets, extrudates, rings, spirals, pyramids, cylinders, prisms, cuboids, cubes, etc.

The shaped body can in the simplest case consist only of catalytically active composition which may, if appropriate, be diluted with inert material. Such shaped catalyst bodies are usually referred to as all-active catalysts.

In the case of all-active catalysts, shaping can, for example, be carried out by compacting catalytically active powder (e.g. a pulverulent active multielement oxide composition) to produce the desired catalyst geometry (e.g. by tableting, sintering, screw extrusion or ram extrusion). Shaping aids can be added in this procedure.

As an alternative, shaping can be achieved by coating a geometric body of catalytically inactive material (inert material) with active composition. Just like the all-active shaped catalyst bodies, such an inert support body can have a regular or irregular shape. Coating can in the simplest case be carried out by, for example, moistening the surface of an inert support body by means of a liquid binder and subsequently applying pulverulent active composition to the moistened surface so that it adheres to the surface. The resulting catalysts are referred to as coated catalysts.

Suitable inert support bodies for many heterogeneously catalyzed gas-phase reactions are porous or nonporous aluminum oxides, silicon dioxide, thorium dioxide, zirconium dioxide, silicon carbide or silicates such as magnesium or aluminum silicate (e.g. steatite of the type C220 from CeramTec) and also metals such as stainless steel or aluminum.

Instead of coating the geometric inert (inert in this context generally means that when the reaction gas mixture is passed over a charge consisting only of diluent shaped bodies under the reaction conditions, the conversion of the reactants is $\leq 5$ mol %, usually $\leq 2$ mol %) support bodies with active composition, the support body can in many cases also be impregnated with a solution of the catalytically active substance, followed by evaporation of the solvent. The shaped catalyst bodies resulting from such a procedure are usually referred to as supported or impregnated catalysts.

The longest dimension of such shaped catalyst bodies (longest possible direct connecting line between two points on the surface of the shaped catalyst body) is usually from 1 to 20 mm, often from 2 to 15 mm and frequently from 3 or 4 to 10 or 8 or 6 mm. In the case of rings, the wall thickness is in addition usually from 0.5 to 6 mm, frequently from 1 to 4 or 3 or 2 mm.

The active compositions employed are particularly frequently noble metals (e.g. Ag) or oxidic compositions which comprise oxygen together with only one or more than one other element (multielement oxide compositions, e.g. multimetal oxide compositions).

Only in very few heterogeneously catalyzed gas-phase reactions over the fixed bed of catalyst present in the tubes of shell-and-tube reactors does the fixed bed of catalyst consist of a single bed of shaped catalyst bodies which is homogeneous along the individual catalyst tube and completely fills the catalyst tube.

Rather, a catalyst tube charge in the majority of cases consists of different sections of catalyst charge installed above one another. Each of the individual bed sections consist of a homogeneous bed of shaped catalyst bodies. However, their makeup (formulation) generally changes abruptly on going from one bed section to the next bed section. This results in fixed catalyst beds which have a heterogeneous structure along an individual catalyst tube. This is also referred to as a structured charge (or bed) in the catalyst tubes.

Examples of such structured charges in catalyst tubes are described, inter alia, in the documents EP-A 979 813, EP-A 90 074, EP-A 456 837, EP-A 1 106 598, U.S. Pat. No. 5,198, 581 and U.S. Pat. No. 4,203,903.

In the simplest case, two different sections of catalyst charge in a reaction tube can differ from one another only in that shaped catalyst bodies comprising a single type of active composition have been diluted with a differing proportion of inert shaped bodies having no active composition (also known as shaped diluent bodies; in the simplest case, they can be inert support bodies, but can also be shaped bodies made of metal). The shaped diluent bodies can have the same geometry as or a different geometry (their possible longest dimension range is generally subject to the same limits as in the case of the shaped catalyst bodies) as the shaped catalyst bodies. Dilution profiles (dilution structures) of a variety of types can be produced by arranging sections of catalyst charge having differing degrees of dilution in series along a catalyst tube, in each case matched specifically to the requirements of the gas-phase reaction to be carried out. In many cases, the dilution structure is selected so that the degree of dilution decreases in the flow direction of the reaction gas mixture (i.e. the volume-specific active composition increases in the flow direction, so that the volume-specific activity is low where the reactant concentration is high and vice versa). However, a converse or completely different dilution profile (activity structuring) can also be selected if necessary. In the simplest case, a structured charge in a catalyst tube can be such that a section of catalyst charge composed of shaped catalyst bodies comprising active composition (which may be diluted with shaped diluent bodies) is located, for example, at the bottom of the catalyst tube and above it there is a section of catalyst charge consisting only of shaped diluent bodies (such sections of charge consisting only of shaped diluent bodies will hereinafter also be regarded as sections of charge comprising shaped catalyst bodies). It is also possible for two sections of charge made up of identical shaped catalyst bodies comprising an active composition to be interrupted by a section consisting only of shaped diluent bodies.

Of course, activity structuring can also be produced by a mixture which does not change along the section of two or more different shaped catalyst bodies comprising an active composition being present in a section of charge in a catalyst tube. Here, the shaped catalyst bodies can differ only in their geometry or only in the chemical makeup of the their active composition or only in the physical nature of their active composition (e.g. pore distribution, specific surface area, etc.) or only in the proportion by weight of the active composition applied to an inert shaped diluent body. However, they can also differ in a plurality or all of the abovementioned differentiating features. In addition, they can also include shaped diluent bodies. In place of activity structuring, the charge in the catalyst tubes can also have selectivity structuring. The latter is particularly advantageous when the gas-phase reaction occurs as a subsequent reaction and individual active compositions are able to catalyze the various sequential reaction steps in a tailored way.

Overall, a uniformly charged section in a reaction tube in the case of a charge structured in sections (from the bottom upward) in catalyst tubes represents a particular formulation of shaped catalyst bodies which may consist of only one type of shaped catalyst bodies, only one type of shaped diluent bodies, a mixture of shaped catalyst bodies, a mixture of shaped catalyst bodies and shaped diluent bodies or a mixture of various shaped diluent bodies.

A catalyst tube which has been charged in a structured fashion thus has by definition at least two, frequently three or four, often five or six, or seven or eight to ten or more sections of charge which differ in the formulation of shaped catalyst bodies present therein in respect of their type and/or amount, i.e. are generally not identical.

Uniform charging of catalyst tubes which are charged in such a structured fashion merely requires, firstly, that the same formulation of shaped catalyst bodies which does not fluctuate along the catalyst tube section is present in corresponding catalyst tube sections. However, it also requires, secondly, that identical amounts of the same formulation of shaped catalyst bodies are present in corresponding catalyst tube sections.

To achieve this objective in the case of a multiplicity of (one thousand and more) catalyst tubes (working tubes), use has been made in the prior art of catalyst charging machines which introduce measured portions of the respective formulation of shaped catalyst bodies directly from stock containers containing the formulation into the respective catalyst tube (cf., for example, DE-A 199 34 324, WO 98/14392 and U.S. Pat. No. 4,402,643). The primary type of parameters sought here is a uniform rate of introduction, (i.e. a very constant amount of the respective shaped catalyst body formulation introduced per unit time during charging). The product of introduction rate and introduction time determines the portion introduced, and the dimension of the charged section.

However, the methodology of the prior art has various disadvantages. Firstly, the introduction rate is not completely satisfactorily constant over time, which leads to deviations in the portions introduced. This is because, inter alia, shaped bodies to be introduced are positioned transversely and can thus at times partially block the shaped body outlet of the charging machine. If an individual formulation of shaped catalyst bodies consists of more than one type of shaped body, partial demixing can occur in the stock container, and this ultimately leads to some degree of formulation fluctuations compared to corresponding sections of charge in different catalyst tubes. Even within one and the same section of charge in an individual catalyst tube, formulation fluctuations can result along the section of charge. In addition, the speed of charging achieved is frequently not fully satisfactory. The latter is particularly important because production, viz. the gas-phase reaction, is interrupted during charging of the catalyst tubes.

It was therefore an object of the present invention to provide an improved method of charging catalyst tubes of a bundle of catalyst tubes in a structured fashion.

We have accordingly found a method of charging catalyst tubes of a bundle of catalyst tubes in a structured fashion, in which individual catalyst tubes of the bundle of catalyst tubes are charged in a uniform manner from the bottom upward in sections with different formulations of shaped catalyst bodies, wherein a particular section of the charge in the catalyst tubes is produced by firstly producing uniform portions of the appropriate formulation of shaped catalyst bodies, producing packets filled with a uniform amount of the formulation of shaped catalyst bodies by enclosing such portions in a packaging material and emptying a number of the packets into each of the individual catalyst tubes. This number of packets emptied into one catalyst tube is usually $\geq 1$.

According to the invention, the uniformity interval of the portions is generally (based on the number average of all uniformly produced portions) less than $\pm 1\%$ by weight or less than $\pm 0.3\%$ by weight, or less than $\pm 0.1\%$ by weight, and in favorable cases less than $\pm 0.01\%$ by weight. The relative uniformity interval is smaller, the larger the portion present in the individual packet.

The method of the invention is generally applicable to shaped catalyst bodies whose longest dimension L is (significantly) smaller than the internal diameter D of the reaction tubes. However, it is usually of the same order of magnitude as this diameter. The ratio D/L will frequently be from 2:1 or 3:1 to 20:1, or from 4:1 to 10:1.

The amount present in a packet charged with shaped catalyst bodies can advantageously be from 50 g to 5 kg, matched to the desired length of the section of charge and determined beforehand in pouring tests in transparent tubes of appropriate geometry. The amount of a portion will frequently be from 100 g to 3 kg and often from 200 g or 300 g to 2 kg, i.e. the amount can be, for example, 400 g, 600 g, 800 g, 1000 g, 1200 g, 1400 g, 1600 g and 1800 g etc. This generally corresponds to numerically similar charge volumes in l or ml (i.e. in the range from 25 or 50 ml to 5 or 10 l).

According to the invention, the amount in a packet is very particularly preferably such that when it is emptied into a reaction tube it produces all of the desired section of charge in the tube. However, for the purpose of achieving increased homogeneity of the section of charge, the amount corresponding to a portion can also be such that production of a desired section of charge requires more than one (frequently from 2 to 10, often from 2 to 5) packets to be emptied.

Packaging means can be paper bags, bags made of other materials, sacks, boxes, cans, compartments, buckets, crates, baskets, drums, bottles, etc. As packaging material, it is possible to use, depending on the active composition, paper, cardboard, wood, glass, ceramic materials, metals (sheets and foils), plastics, foams, etc. The choice of packaging means and packaging method depends on not only the type of active composition but also on the type of external influences to be expected after packaging, e.g. during storage. For example, heat resistance, insensitivity to shock, opaqueness to light, impermeability to air, impermeability to water vapor, etc., may be required.

For example, it can also be advantageous to package the portions using shrink films which tightly enclose the shaped catalyst bodies packed under reduced pressure and make it possible for packets to be stacked particularly simply. Care should generally be taken to ensure that the packaging material does not adversely affect the catalyst quality by, for example, the packaging material giving off foreign substances such as volatile plasticizers or residual monomers which could occupy and block the catalytically active surface during storage of packets.

Transparent polyethylene (high, low or medium density) is a particularly preferred packaging material according to the invention, especially when the active composition is a multi-element oxide, e.g. a multimetal oxide. It is generally advantageous for the moisture (water vapor) permeability of the packaging at 25° C. to be $\leq 1.0$ g m$^{-2}$d$^{-1}$ (d=day). For this purpose, it is possible to use, for example, aluminum-coated bags or bags comprising liquid crystal polyester films. Preferred means are bags, in particular when these are made of plastic (e.g. polyethylene) and can be welded shut in an airtight manner.

The production of packets which are charged with a uniform amount of a formulation of shaped catalyst bodies and are to be employed according to the invention can be carried out extremely efficiently and at high speed by means of packaging machines prior to the actual charging procedure. Dispensing machines are particularly advantageous for the method according to the invention. In the case of this subset of packaging machines, the packaging is present in a form which has been preprepared for dispensing (although packaging machines which produce the packaging themselves from, for example, film provided in roll form are frequently used). They comprise as essential components a metering device which divides the material to be charged according to weight or number of pieces, the actual charging unit and a closure unit which, for example, closes the packaging loosely to firmly by twisting, turning, folding, adhesive bonding, welding, by the groove/spring principle or by application of a closure.

If the formulation of shaped catalyst bodies to be introduced according to the invention comprises more than one type of shaped body, the production according to the invention of uniform portions of the formulation is advantageously carried out as follows.

Firstly, each type of shaped body is produced in a large amount and with the greatest possible uniformity.

Uniform portions of each type of shaped body are then produced continuously according to weight or number of pieces by means of a metering apparatus provided for the particular type of shaped body and are tipped onto a conveyor belt provided for the particular type of shaped body. The individual conveyor belts transport the uniform portions of the particular type of shaped body at appropriate rates. The conveyor belts come together at their ends and discharge the desired amount of the particular type of shaped body into the packets. This produces packets whose contents are indistinguishable both in respect of amount and in respect of formulation.

Charging of the catalyst tubes can then be carried out in a simple manner by emptying a number calculated beforehand from the dimensions of the catalyst tubes and the desired length of the section of charge (and determined in pouring experiments on transparent reaction tubes of corresponding geometry) of packets charged with the formulation of shaped catalyst bodies is emptied into the respective catalyst tube. In the method of the invention, the amount packed in an individual packet is always≦(less than equal to) the amount to be introduced into an individual catalyst tube. It will frequently be the case that the same number of packets are emptied into each catalyst tube. According to the invention, the number to be emptied into a catalyst tube is preferably an integer. Since each packet provided for a section of charge contains the same formulation and amount, sections of charge which are particularly uniform over various catalyst tubes can thus be produced in a short time according to the invention.

The simplest way of emptying the packets into the catalyst tubes is manually. However, to empty the packets into the catalyst tubes so as to obtain a very uniform bulk density, emptying can also be carried out by means of an apparatus as described in DE-A 19934324 for charging tubes with loose material. This has a particular number of dispensing tubes which can simultaneously be lowered into the catalyst tubes to be charged. The machine has one stock container per dispensing tube, and this is connected via a pouring port and a transport chute to the respective dispensing tube. By means of an individually operatable metering zone, the stream of loose material discharged from the respective stock container to the transport chute is limited to the desired rate of introduction into the catalyst tubes. Instead of emptying the packets charged according to the invention directly into the respective catalyst tubes, they can also be emptied in succession in accordance with consumption via the respective stock container (the capacity of a stock container preferably corresponds to the contents of a packet or the contents of one or two packets) of the above-described charging apparatus into the respective catalyst tube at a very uniform transport rate. Since the stock container does not contain a large amount of the formulation of shaped catalyst bodies to be charged at any point in time, this naturally counters demixing of the bodies in the stock container and the constancy of the rate of introduction results in a very uniform bulk density. Typical transport rates can be from 500 shaped bodies/minute to 40 000 shaped bodies/minute.

Particularly preferred charging machines have cascades of stock containers which are connected to one another and make essentially continuous implementation of the method of the invention possible.

Above each stock container in such an arrangement there is a second stock container which can be charged with the portion corresponding to one packet before the contents of the stock container underneath have been completely discharged.

The stock containers arranged above one another can also be connected to different dispensing tubes.

The method of the invention is suitable, for example, when the active composition of the shaped catalyst bodies present in a packet is an Mo-, Bi- and Fe-containing multimetal oxide (e.g. an oxide of the general formula II in DE-A 4442346) and/or an Mo- and V-containing multimetal oxide (e.g. an oxide of the general formula I in DE-A 4442346). However, it is also suitable when the active composition of the shaped catalyst bodies present in a packet is a V- and P-containing multielement oxide (e.g. EP-A 302509; e.g. for maleic anhydride production) or a V- and Cs-containing multielement oxide (e.g. EP-A 1084115, EP-A 1117484 or EP-A 1311467; e.g. for the preparation of phthalic anhydride) or an Mo- and P-containing multielement oxide (e.g. DE-A 4329907; e.g. for methacrylic acid production).

The methodology recommended in the present text is particularly useful for the charging of catalyst tubes in sections with the structured catalyst tube charges recommended in the documents EP-A 700893, EP-A 700714, DE-A 10337788, DE-A 10313210, DE-A 10313214, DE-A 10313213, DE-A 10313212, DE-A 10313211, DE-A 10313208, DE-A 10313209 for the heterogeneously catalyzed partial oxidation of propene and/or acrolein to acrylic acid. The packaging material used should be a packaging material which is highly impermeable to water vapor and is welded shut in an airtight manner. The recommendations of JP-A 2003-10695 can be followed for this purpose. If necessary, additional use can be made of the charging aids recommended in DE-A 10337998. This also applies to the charging measures recommended in the prior art cited in the present text.

The method of the invention is impressive both in terms of the high degree of charge uniformity which can be achieved using it and also in terms of the high charging speeds combined with the same charging uniformity which can be realized using it. Both are due in no small measure to the fact that dispensing of portions and charging are decoupled from one another both in space and time. The length of a homogeneous section of charge when the method of the invention is used will typically be from 20 cm to 800 cm, frequently from 50 cm to 200 cm.

According to the invention, it is particularly advantageous to provide the packets containing the same formulation of shaped catalyst bodies with a particular color. After they have been emptied into an individual reaction tube for producing the desired section of charge, the respective reaction tube can then advantageously be closed with a cap of the same color to indicate that the step is complete. This constitutes a very simple way of preventing a reaction tube being charged more than once with one and the same formulation of shaped catalyst bodies. As an alternative, the fill height in the reaction tube can be checked by means of a measuring stick.

EXAMPLE AND COMPARATIVE EXAMPLE

A) Using the method described in example 1 of DE-A 10046957, 70 kg of an all-active catalyst ring having the geometry 5 mm×3 mm×2 mm (external diameter ×length× internal diameter) were produced.

The stoichiometry of the active composition was

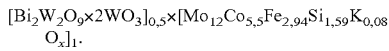

$[Bi_2W_2O_9 \times 2WO_3]_{0.5} \times [Mo_{12}Co_{5.5}Fe_{2.94}Si_{1.59}K_{0.08}O_x]_1$.

The 70 kg of all-active catalyst rings were homogeneously mixed with 30 kg of steatite rings having the geometry 7 mm×7 mm×4 mm and a 6 m long, transparent plastic tube having an internal diameter of 35 mm was charged with this mixture by means of a catalyst charging machine as described in DE-A 19934324 until the plastic tube had been completely filled. In this charging procedure, all of the homogeneous mixture was placed in a stock container and the plastic tubes were charged from this.

Visual examination of the plastic tube which had been filled in this way revealed inhomogeneous zones at a number of fill heights.

B) 70 g of the all-active catalyst rings and 30 g of the steatite rings from A) were introduced into polyethylene bags. 55 of these filled polyethylene bags were emptied in succession into the stock container of the same catalyst charging machine as in A) and via the catalyst charging machine at the same charging rate as in A) into a plastic tube identical to that in A).

Visual examination of the plastic tube which had been filled in this way revealed no inhomogeneous zones.

C) Using the all-active catalyst rings from A (geometry: 5 mm×3 mm×2 mm) and steatite rings of the same geometry (5 mm×3 mm×2 mm) portions of the formulation I "357 g of all-active catalyst ring/153 g of steatite ring" were packed in polyethylene bags by means of a packing machine (packets I). The total amount of the formulation I which was packed was 5.685 metric tons.

In addition, portions of 835 g of formulation II consisting exclusively of the all-active catalyst ring from A were packed in polyethylene bags (packets II). The total amount of the formulation II which was packed was 9.308 metric tons.

11 148 catalyst tubes made of ferritic steel and having an internal diameter of 25.4 mm (wall thickness: 2 mm) and a length of 3.20 m were charged by means of a catalyst charging machine as described in DE-A 19934324 by emptying firstly one packet II (into all tubes) and then one packet I (into all tubes) into them in succession. The uniformity interval of the charging time for the individual tubes was, based on the time average, less than ±5 seconds. The mean charging time was 45 seconds. Pressure drop measurements on 200 randomly selected individually filled tubes at an air throughput of 3000 standard l/l·h gave a uniformity interval about the number average pressure drop of less than ±3%.

The filled tubes are suitable for the partial oxidation of propene to acrolein. Refilling for improving the uniformity, as recommended by WO 03/057653, was not necessary.

U.S. Provisional Patent Application No. 60/568,699, filed on May 7, 2004, is incorporated by reference into the present patent application. With regard to the abovementioned teachings, numerous alterations and modifications of the present invention are possible. It can therefore be assumed that the invention can, within the scope of the accompanying claims, be carried out in ways other than those specifically described herein.

The invention claimed is:

1. A method of charging catalyst tubes, comprising:
   charging a plurality of catalyst tubes with shaped bodies so that each catalyst tube includes at least two sections having different formulations of shaped bodies and the sections are provided uniformly among the plurality of catalyst tubes;
   wherein:
   at least two of the sections having different formulations of shaped bodies charged into the plurality of catalyst tubes are obtained by filling a uniform amount of a corresponding formulation of shaped bodies into each of a plurality of packets, and emptying into each respective one section of the plurality of catalyst tubes the same number of packets;
   a formulation of shaped bodies consists of:
      a mixture of two or more shaped catalyst body types that differ in one of more of the following ways: geometry, chemical make-up of active composition, physical nature of active composition and proportion by weight of active composition; or
      a mixture of shaped catalyst bodies and shaped diluent bodies; and
   the amount and formulation within each packet is determined according to weight or number of pieces of the different shaped catalyst body types;
   the number of packets to be emptied into each respective one section of each of the plurality of catalyst tubes is an integer from 1 to 10; and
   the plurality of catalyst tubes comprises a bundle of at least 1,000 catalyst tubes having an internal diameter of from 10 to 50 mm.

2. The method according to claim 1, wherein each packet comprises from 50 g to 5 kg of shaped bodies.

3. The method according to claim 1, wherein the shaped bodies have a longest dimension of from 1 mm to 20 mm.

4. The method according to claim 1, wherein each catalyst tube includes at least three different sections having different formulations of shaped bodies.

5. The method according to claim 1, wherein the ratio of an internal diameter D of each catalyst tube to a longest dimension L of the shaped bodies present in a packet is from 2:1 to 20:1.

6. The method according to claim 1, wherein the formulation of shaped bodies includes shaped catalyst bodies comprising an Mo—, Bi—and Fe—containing multimetal oxide and/or an Mo—and V—containing multimetal oxide.

7. The method according to claim 1, wherein the packets are filled with an amount of shaped bodies sufficient to provide all of a desired section in the catalyst tubes.

8. The method according to claim 1, wherein the packets are emptied manually into the catalyst tubes.

9. The method according to claim 1, wherein the packets are emptied into the catalyst tubes by means of a catalyst charging machine.

10. The method according to claim 9, wherein the catalyst charging machine has stock containers whose capacity corresponds to the portion in a packet.

11. The method according to claim 1, wherein the number of packets emptied into one catalyst tube is from 1 to 5.

* * * * *